US010399728B2

(12) United States Patent
Brozell et al.

(10) Patent No.: US 10,399,728 B2
(45) Date of Patent: Sep. 3, 2019

(54) NECK FINISH FOR A CONTAINER

(71) Applicant: Owens-Brockway Glass Container Inc., Perrysburg, OH (US)

(72) Inventors: Brian J. Brozell, Maumee, OH (US); Edward A. Grant, Toledo, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 1438 days.

(21) Appl. No.: 14/276,450

(22) Filed: May 13, 2014

(65) Prior Publication Data

US 2015/0329232 A1 Nov. 19, 2015

(51) Int. Cl.
*B65D 1/02* (2006.01)
*C03B 9/325* (2006.01)
*B65D 41/04* (2006.01)

(52) U.S. Cl.
CPC ........... *B65D 1/0246* (2013.01); *B65D 41/04* (2013.01); *B65D 41/0471* (2013.01); *C03B 9/325* (2013.01); *B65D 2251/04* (2013.01)

(58) Field of Classification Search
CPC ..... B65D 41/0471; B65D 47/20; B65D 41/04
USPC ......................................................... 215/44
See application file for complete search history.

(56) References Cited

U.S. PATENT DOCUMENTS

| | | | |
|---|---|---|---|
| 1,866,770 A | 7/1932 | Hilgenberg | |
| 2,589,005 A | 3/1952 | Welhart | |
| 3,794,200 A * | 2/1974 | Marks | B65D 41/0471 215/201 |
| 4,373,641 A * | 2/1983 | Banich, Sr. | B65D 41/04 215/331 |
| 4,948,001 A | 8/1990 | Magly | |
| 5,553,727 A | 9/1996 | Molinaro | |
| D382,806 S | 8/1997 | Wilson et al. | |
| 5,775,528 A | 7/1998 | Wohlgemuth et al. | |
| 5,829,609 A * | 11/1998 | Beck | B65D 50/048 215/217 |
| D407,648 S | 4/1999 | Glaser et al. | |
| D409,091 S | 5/1999 | Beaver et al. | |
| 6,158,603 A | 12/2000 | Price et al. | |
| 6,227,391 B1 | 5/2001 | King | |
| D451,395 S | 12/2001 | Vultaggio et al. | |

(Continued)

FOREIGN PATENT DOCUMENTS

JP    2002019812 A    1/2002

OTHER PUBLICATIONS

PCT Search Report and Written Opinion, Int. Serial No. PCT/US2015/029817, Int. Filing Date: May 8, 2015, Applicant: Owens-Brockway Glass Container Inc., dated Jul. 17, 2015.

*Primary Examiner* — Anthony D Stashick
*Assistant Examiner* — Raven Collins (57) ABSTRACT

A container neck finish includes an outer surface of the neck finish having a parting line, an axially facing sealing surface, a bead projecting radially outwardly from the outer surface and axially spaced from the sealing surface, and circumferentially spaced retention elements projecting radially outwardly from the outer surface, and being located axially between the sealing surface and the bead. At least one of the retention elements includes a stop portion including a ramp portion that extends circumferentially toward the parting line and radially inwardly toward the neck finish outer surface and converges therewith at a location within ten angular degrees of the parting line.

22 Claims, 5 Drawing Sheets

(56) References Cited

U.S. PATENT DOCUMENTS

| | | |
|---|---|---|
| D493,368 S | 7/2004 | Goda |
| D528,428 S | 9/2006 | Nozato et al. |
| D540,681 S | 4/2007 | Nozato et al. |
| 7,568,587 B2 | 8/2009 | Cook et al. |
| 7,832,578 B1 | 11/2010 | Willis et al. |
| 7,861,874 B2 | 1/2011 | Cook et al. |
| 2009/0236302 A1 | 9/2009 | Labadie et al. |
| 2011/0132865 A1* | 6/2011 | Hunter ................ B65D 1/0223 215/381 |

* cited by examiner

FIG. 3

NECK FINISH FOR A CONTAINER

The present disclosure is directed to containers and, more particularly, to closure retention elements of a container neck finish.

BACKGROUND AND SUMMARY OF THE DISCLOSURE

Containers typically include a neck finish having helical threads for receiving a closure, lid, or cap. U.S. patents that illustrate containers of this type include U.S. Pat. No. 2,589,005 titled "Glass Container" (hereafter, the '005 patent). The '005 patent describes a screw-threaded neck portion, more specifically, it describes a spiral screw thread having substantially greater length than the circumference of the neck.

Another type of container may include a neck finish including three or more locking lugs, each having circumferentially extending cam portions, and stop portions extending axially from the cam portions and including ramp portions all extending at the same angle. Typically, the lugs circumferentially overlap one another, a first parting line of the neck finish intersects a straight portion of one of the locking lugs, and a second parting line is spaced between circumferential ends of adjacent lugs. Usually, one of the adjacent lugs has a circumferentially truncated ramp portion with a circumferential edge that is spaced at least fifteen angular degrees from the second parting line to provide clearance for opening and closing of neck ring equipment used to form the neck finish. Such locking lug designs can be susceptible to cross threading of a closure on the neck finish.

A general object of the present disclosure, in accordance with one aspect of the disclosure, is to provide a neck finish for a container that minimizes the likelihood of cross threading a closure thereto.

The present disclosure embodies a number of aspects that can be implemented separately from or in combination with each other.

A container neck finish in accordance with one aspect of the disclosure includes a generally cylindrical outer surface, an axially facing sealing surface, a circumferentially continuous bead projecting radially outwardly from the outer surface and axially spaced from the sealing surface, and at least three circumferentially spaced retention elements projecting radially outwardly from the outer surface, and being located axially between the sealing surface and the bead. The retention elements include only one first retention element including a first cam portion extending circumferentially, spaced axially from the sealing surface at a first level, and intersected by a first parting line, an upturned portion extending from a first end of the cam portion, and a first stop portion extending from a second end of the cam portion and including a first ramp portion extending to the bead. The retention elements also include two or more additional retention elements including a second retention element and a third retention element, each including a second cam portion extending circumferentially, and spaced axially from the sealing surface at the first level, a venting portion axially spaced from the bead at a second level different from the first level, and having a circumferentially extending retention portion, a downturned end at a first end of the venting portion, and a connecting portion extending between the retention portion and the cam portion, and a second stop portion extending from a second end of the second cam portion and including a ramp portion extending to the bead. The ramp portion of the third retention element is spaced less than ten angular degrees from a second parting line and there is no circumferential overlap of the retention elements.

In accordance with another aspect of the disclosure, there is provided a container neck finish that includes a generally cylindrical outer surface, an axially facing sealing surface, a bead projecting radially outwardly from the outer surface and axially spaced from the sealing surface, and at least three circumferentially spaced retention elements projecting radially outwardly from the outer surface, and being located axially between the sealing surface and the bead. The retention elements include a first retention element including a first cam portion, a upturned portion extending from a first end of the cam portion, and a first stop portion extending from a second end of the cam portion and including a first ramp portion extending to the bead. The retention elements also include a second and a third retention element, each of the retention elements including a second cam portion axially spaced from the bead, a venting portion axially spaced from the second cam portion toward the axially facing sealing surface, and a second stop portion that includes a ramp portion extending to the bead. The ramp portion of the third retention element includes a ramp outer surface that extends from the stop portion and radially decreases and converges to the neck finish outer surface, wherein the intersection between the ramp outer surface and the neck finish outer surface is within ten angular degrees of a parting line on the neck finish.

In accordance with another aspect of the disclosure, there is provided a container neck finish that includes an outer surface of the neck finish having a parting line, an axially facing sealing surface, a bead projecting radially outwardly from the outer surface and axially spaced from the sealing surface, and a plurality of circumferentially spaced retention elements projecting radially outwardly from the outer surface, and being located axially between the sealing surface and the bead. At least one of the retention elements includes a stop portion including a ramp portion that extends circumferentially toward the parting line and radially inwardly toward the neck finish outer surface and converges therewith at a location within ten angular degrees of the parting line.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION

Figure 1A:
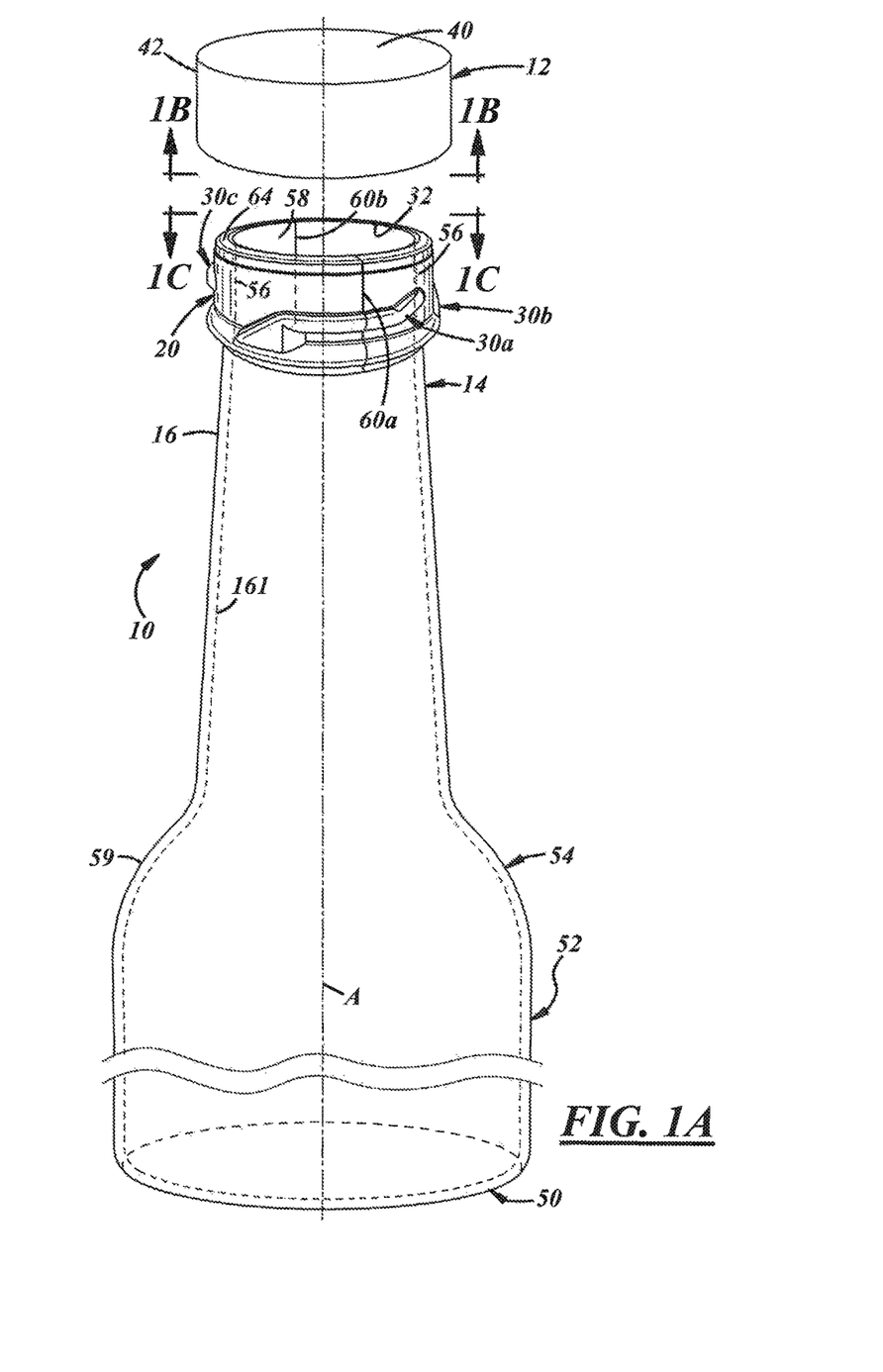
FIG. 1A is a fragmentary, exploded perspective view of a container and a closure in accordance with an illustrative embodiment of the present disclosure.

FIG. 1A illustrates an embodiment of a package 10 that includes a closure 12 and a container 14 having a neck 16 with a neck finish 20, as will be discussed in further detail herein below. The neck finish 20 may be generally cylindrical and have several circumferentially located closure retention elements 30a, 30b, 30c on or near a mouth or opening 32. The following detailed description discloses retention elements 30a, 30b, 30c that are configured for coupling of the closure 12 to the container 14 and venting (or pressure relieving) of the package 10 during opening thereof, and for reducing instances of cross threading of the closure 12 with respect to the container 14. The elements 30a, 30b, 30c, may include lugs, bayonet features, or any other suitable closure retention features.

Figure 1B:
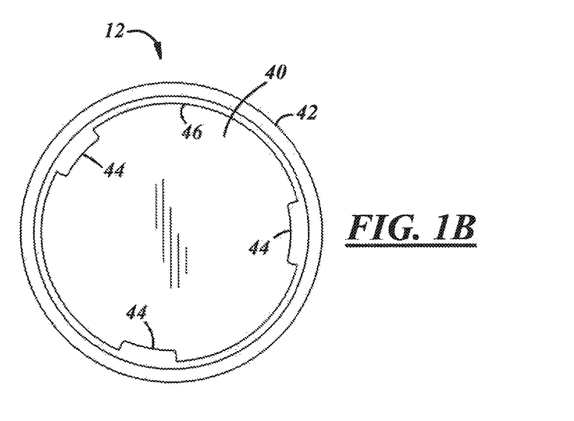
FIG. 1B is a bottom view of the closure shown in FIG. 1A along lines 1B-1B.

The closure 12 (also shown in FIG. 1B) may be any suitable device for retaining the contents or product of the container 14. The closure 12 may include a cap or any other suitable type of closure, and may be composed of plastic, metal, glass, ceramic, or any other suitable material. The closure 12 may include a base wall 40 and an annular outer skirt 42 extending from the base wall 40 and having one or more internal container retention elements 44 (FIG. 1B) projecting from an internal surface 46 (FIG. 1B) thereof for cooperation with the one or more retention elements 30a, 30b, 30c on the container 14. The elements 44 may include lugs, threads or thread segments or bayonet features, or any other suitable container retention features.

The container 14 shown in FIG. 1A may be of any suitable shape, and may include a jug, jar, bottle, other food or beverage container, or any other suitable container and may be composed of plastic, glass, metal, composite, or any other suitable material, and more particularly, may be produced in accordance with illustrative embodiments of a glass manufacturing process disclosed herein below. The container 14 may include a base 50 at one axial end upon which the container may be supported, a body 52 extending axially from the base 50, a shoulder 54 extending radially and axially from the body 52, and the neck 16 extending axially from the shoulder 54. The neck 16 includes the neck finish 20 having an outer surface 56 and an inner surface 58 (also shown in FIG. 1C). A sidewall 59 of the container 14 may extend from the base 50 to the neck finish 20 and include the body 52, the shoulder 54, and at least part of the neck 16. As used herein, the term axial includes oriented generally along a longitudinal axis of the closure 12, the container 14, or the package 10 and may include but is not limited to a direction that is strictly parallel to a longitudinal central axis A of the container 14.

As will be appreciated by artisans of ordinary skill, the neck finish 20 of the container 14 may have parting lines (60a, 60b) (i.e., a longitudinal ridge, edge, fin, etc.) as a result of a container formation process, e.g., when two halves of a blank mold come together. This process may leave one parting line 60a (e.g., a first parting line) along the length of neck finish 20 on one side, and another parting line 60b (e.g., a second parting line) on the opposite side (e.g., approximately 180 degrees from the first parting line 60a).

The body 52 and neck 16 may be generally cylindrical, or they may be tapered or of any other suitable shape. As also shown in FIGS. 2-5, the outer surface 56 (shown here as cylindrical) may include an axially facing sealing surface 64, a bead 66 projecting radially outwardly from the outer surface 56 and axially spaced from the sealing surface 64, and circumferentially spaced retention elements 30a, 30b, 30c projecting radially outwardly from the outer surface 56 and spaced between the sealing surface 64 and the bead 66. Although three retention elements 30a, 30b, 30c are illustrated, four or more may be incorporated with or without equidistant circumferential spacing therebetween. The bead 66 may be circumferentially continuous entirely around the neck finish 20.

The outer surface 56 may have a radius $R_O$, e.g., measured from axis A (see FIG. 1C), and at least in some embodiments, the corresponding diameter ($2R_O$) may be between 30 and 120 millimeters (mm). The bead 66 may project to radially outwardly to a second radius $R_B$ and may have a generally annular shape. The radius $R_B$ may be 1.19 to 2.46 mm greater than $R_O$ or about 1-10% greater. While the outer surface 56 and bead 66 are shown as cylindrical, other shapes are possible.

Figure 1C:
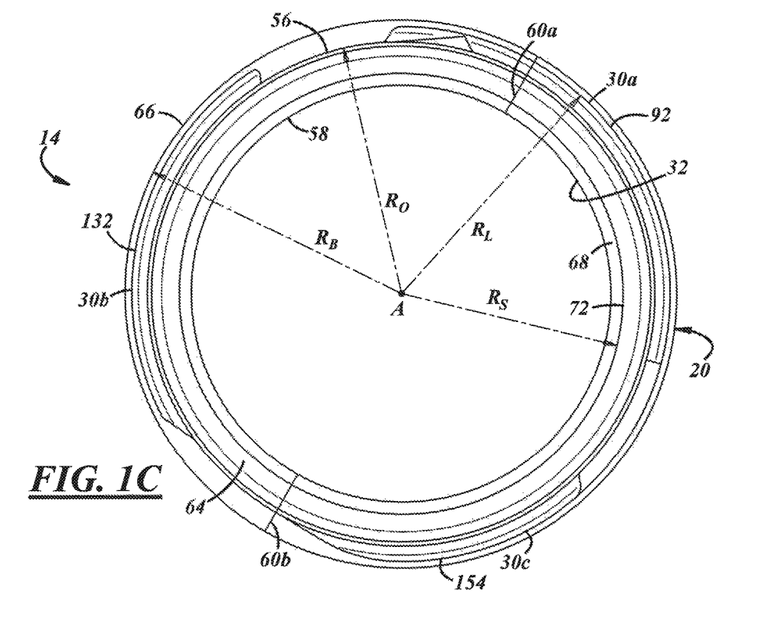
FIG. 1C is a partial top view of the finish of the container shown in FIG. 1 along lines 1C-1C.
Figure 2:
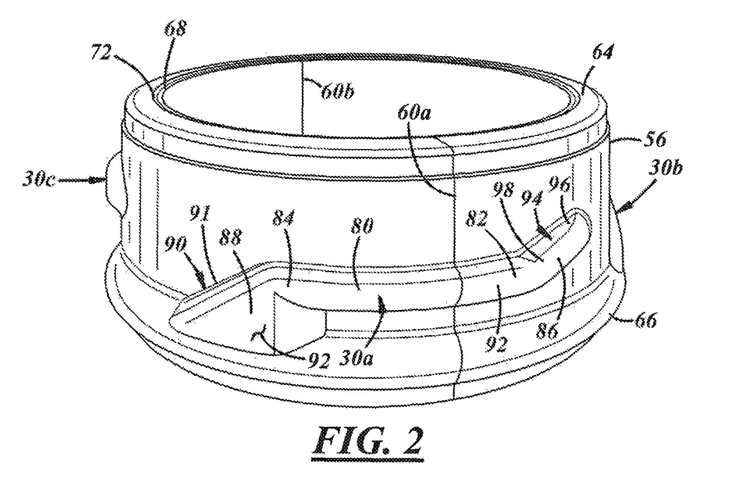
FIG. 2 is an enlarged, fragmentary perspective view of a neck finish of the container shown in FIG. 1A.
Figure 3:
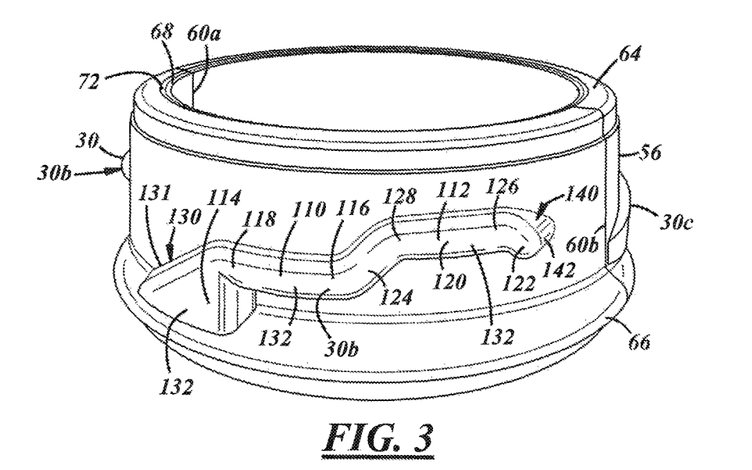
FIG. 3 is another enlarged, fragmentary perspective view of the neck finish of the container shown in FIG. 1A.
Figure 4:
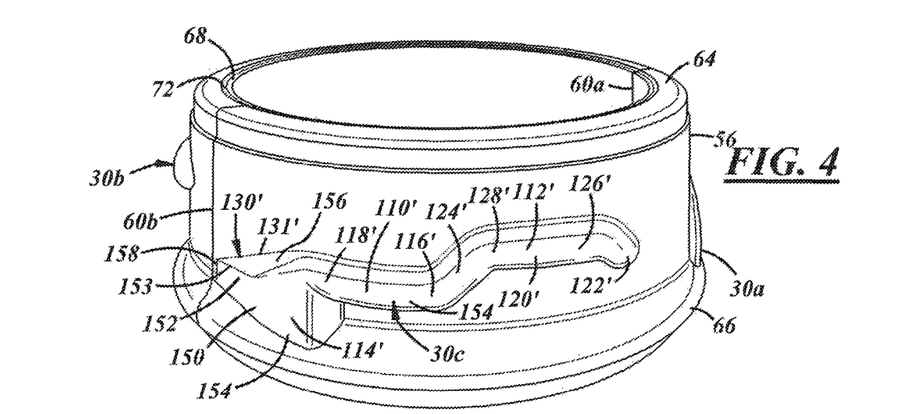
FIG. 4 is another enlarged, fragmentary perspective view of the neck finish of the container shown in FIG. 1A.

In some embodiments (as best shown in FIGS. 2-4), the axially facing sealing surface 64 may be flat or rounded, and the sealing surface 64 may be perpendicular with respect to axis A or may be at an angle with respect thereto. The sealing surface 64 may include a circumferential step-down or lip 68; i.e., the step-down may be a secondary end surface located axially inwardly (see FIG. 1C). The step-down 68 may be defined by a shoulder 72 having a radius $R_S$. In some embodiments, the radius $R_S$ may have a value of 2.29 to 3.30 mm less than $R_O$ (or about 2-11% less than $R_O$).

Returning to FIGS. 2-5, the three circumferentially spaced retention elements 30a, 30b, 30c may be located between the sealing surface 64 and the bead 66, and may partially intersect or overlap with the bead 66. The elements 30a, 30b, 30c may be configured for cooperation with the retention elements 44 of the closure 12. The first element 30a, the second element 30b, and the third element 30c are described below.

Figure 5:
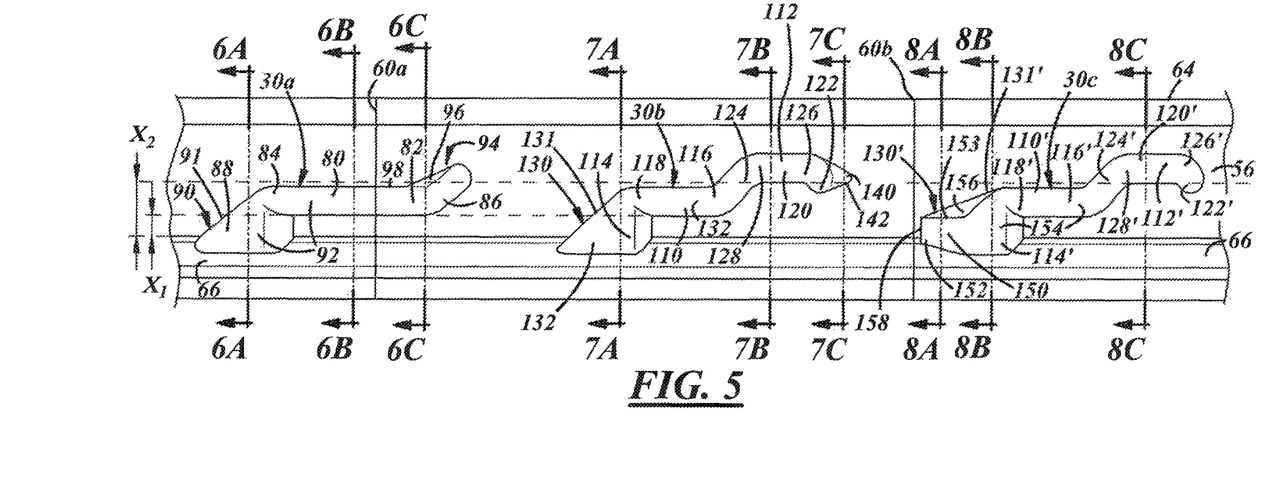
FIG. 5 is a layout view of the neck finish of the container illustrating the neck finish in a plane (instead of a cylinder), illustrating the configurations of closure retention elements on the neck finish.

As shown in FIGS. 2 and 5, the first element 30a may include a cam portion 80 having a first end 82 and a second end 84 circumferentially extending around a portion of the outer surface 56 and axially spaced from the bead 66 at a first level or distance $X_1$ (FIG. 5). The cam portion 80 may be generally parallel to the bead 66 and/or the sealing surface 64. In one implementation, the cam portion 80 may intersect the first parting line 60a. An upturned portion 86 may extend from the first end 82 of the cam portion 80, and a stop portion 88 may extend axially from the second end 84 of the cam portion 80. The stop portion 88 may include a ramp portion 90 extending to and at least partially overlapping or intersecting the bead 66 in a circumferential direction as well as an axial direction. The ramp portion 90 may include an upper edge 91 at an intersection of the ramp portion 90 and the outer surface 56.

Figure 6A:
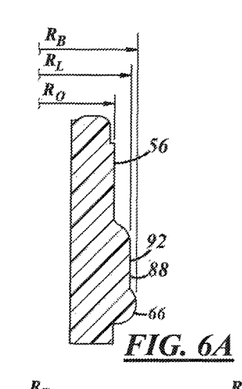
FIG. 6A is a sectional view of the neck finish shown in FIG. 5 along section lines 6A-6A.
Figure 6B:
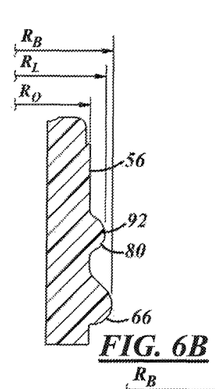
FIG. 6B is a sectional view of the neck finish shown in FIG. 5 along section lines 6B-6B.
Figure 6C:
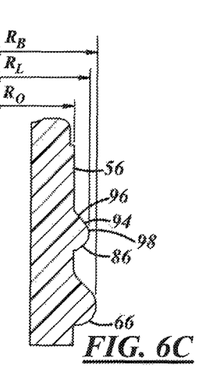
FIG. 6C is a sectional view of the neck finish shown in FIG. 5 along section lines 6C-6C.

In this first element configuration, the cam portion 80, the upturned portion 86, the stop portion 88, and the ramp portion 90 may have a first outer element surface 92, at radius $R_L$ from axis A (see e.g. FIGS. 1C, 6A, and 6B). The cross-sectional shape of the cam portion 80 (FIG. 6B) and upturned portion 86 (FIG. 6C) may vary; however, in at least one implementation (and as shown in FIG. 6B), the cross-section of portions may have a generally uniform bell-curve shape.

In at least one embodiment (see FIGS. 2 and 6C), the upturned portion 86 of the first element 30a may include a first transition feature 94. The first transition feature 94 may include a first sloping surface 96 adjoining the first outer element surface 92 of the first element 30a and the outer surface 56 of the neck finish 20 in a location between the cam portion first end 82 and upturned portion 86. The surface 96 may extend upwardly from an upper side 98 of the upturned portion 86 and the cam portion 80, toward the axially facing sealing surface 64 and converging radially inwardly with the outer surface 56 (thus, the transition feature 94 may have a varying radius between $R_O$ and $R_L$). The first transition feature 94 may have a more gradual slope or curve than the bell-shape of the cam portion 80 or the remainder of the upturned portion 86.

As shown in FIGS. 3 and 5, the second element 30b may be configured to include a cam portion 110 that may extend circumferentially, a venting portion 112 axially spaced from the cap portion, and a stop portion 114 that may extend axially from the cam portion 110. The cam portion 110 may have a first end 116 and a second end 118 and be axially spaced from the bead 66 at the first level $X_1$ (FIG. 5).

The venting portion 112 may include a retention portion 120, a downturned end 122, and a connecting portion 124. The retention portion 120 may be located between a first end 126 and a second end 128 of the venting portion 112, and may be generally parallel to the bead 66 and/or the sealing surface 64. In addition, the retention portion 120 may be axially spaced from the bead 66, but at a second level or distance $X_2$ therefrom. The second level $X_2$ may be greater than the first level $X_1$. The downturned end 122 may be located at the first end 126 of the venting portion 112, and the connecting portion 124 may extend between the retention portion 120 and the cam portion 110, thereby coupling the second end 128 of the venting portion 112 to the first end 116 of the cam portion 110.

Extending from the second end 118 of the cam portion 110 may be the stop portion 114 that further includes a ramp portion 130 that extends to the bead 66 and may at least partially overlap or intersect the bead 66 in a circumferential direction and an axial direction. The ramp portion 130 may include an upper edge 131 at an intersection with the outer surface 56. The ramp portion 130 may extend at an angle with respect to the axis A that is the same as or similar to that of the ramp portion 90 of the first element 30a. For example, the ramp portions 90, 130 may extend at about 45 degrees with respect to the axis A. And the downturned end 122 of the second element 30b may be circumferentially spaced from the second parting line 60b, which parting line 60b is located between the downturned end 122 and the third element 30c.

Figure 7A:
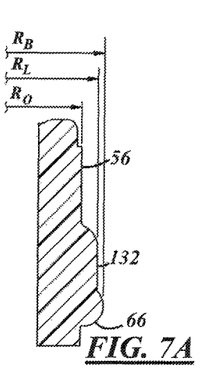
FIG. 7A is a sectional view of the neck finish shown in FIG. 5 along section lines 7A-7A.
Figure 7B:
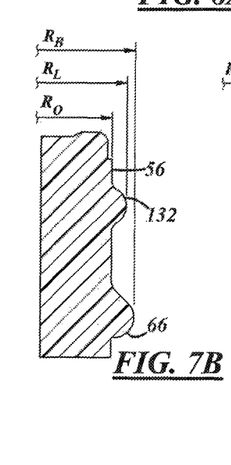
FIG. 7B is a sectional view of the neck finish shown in FIG. 5 along section lines 7B-7B.

The cam portion 110, the venting portion 112, the stop portion 114, and the ramp portion 130 of the second element 30c may have a second outer element surface 132 at radius $R_L$ (FIGS. 7A and 7B). The cross-sectional shape of the cam portion 110, the stop portion 114, and the retention portion 120 may vary; however, in at least one implementation (and as the retention portion 120 is illustrated in FIG. 7B), they may have a generally uniform bell-curve shape.

Figure 7C:
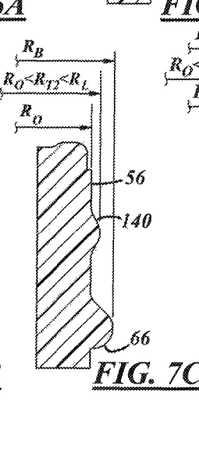
FIG. 7C is a sectional view of the neck finish shown in FIG. 5 along section lines 7C-7C.

In at least one embodiment (FIG. 7C), the downturned end 122 of the second element 30b may include a second transition feature 140 (see also FIG. 5). As shown in FIG. 5, the second transition feature 140 may include a second sloping surface or contour 142 adjoining the second outer element surface 132 and the outer surface 56 having a radius $R_{T2}$ (FIG. 7C). The feature 140 may extend circumferentially towards the second parting line 60b, converging radially inwardly with the outer surface 56 (thus, radius $R_{T2}$ may vary between $R_O$ and $R_L$). The feature 140 may not be present on the third element 30c.

Some of the characteristics of the third element 30c may be similar or identical to those of the second element 30b, and thus will not be re-described below as like numerals indicate like features or elements. For example, the third element 30c also may be configured to have a cam portion 110' that may extend circumferentially, a venting portion 112' axially spaced from the cam portion 110', and a stop portion 114' that may extend axially from the cam portion 110'. In the implementation shown in FIG. 5, a downturned end 122' may not include a transition feature as included in element 30b. However, in at least one embodiment of the third element 30c, a ramp portion 130' that extends from the stop portion 114' may include a third transition feature 150.

Figure 8A:
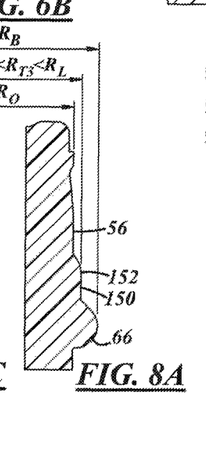
FIG. 8A is a sectional view of the neck finish shown in FIG. 5 along section lines 8A-8A.
Figure 8B:
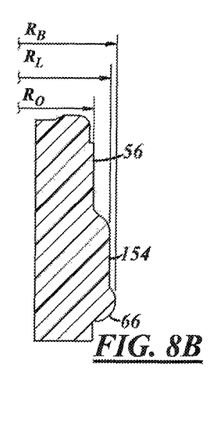
FIG. 8B is a sectional view of the neck finish shown in FIG. 5 along section lines 8B-8B.
Figure 8C:
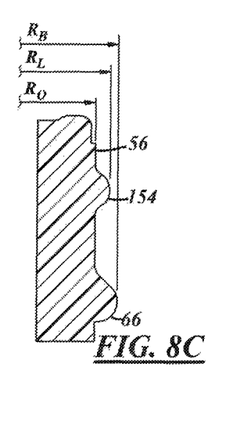
FIG. 8C is a sectional view of the neck finish shown in FIG. 5 along section lines 8C-8C.

For example, the feature 150 may include the ramp portion 130' having a third sloping surface 152 facing circumferentially and radially outwardly and adjoining a third outer element surface 154 (radius $R_L$, FIG. 8B) and the outer surface 56 of the neck finish 20. The third transition feature 150 may extend circumferentially towards the second parting line 60b, converging radially inwardly toward and blending smoothly with the outer surface 56 (thus, the transition feature 150 may have a varying radius $R_{T3}$, where $R_O < R_{T3} < R_L$). This is in contrast to prior art lugs having blunt circumferential shoulders or steps. In at least one implementation, a circumferential edge 158 of the third sloping surface 152 may extend axially and may intersect the outer surface 56 at the second parting line 60b. In other implementations, the circumferential edge 158 may be circumferentially spaced apart between 0 and 10 angular degrees from the parting line 60b and, more particularly may be circumferentially spaced apart between 2 and 5 angular degrees from the parting line 60b.

The transition feature 150 further may include a fourth sloping surface 156 that may be a compound surface facing axially and at least partially radially outwardly and adjoining at least part of the third sloping surface 152 and the outer surface 56 of the neck finish 20. A convergence or intersection between the surfaces 56, 156 may include an upper edge 131' of the ramp portion 130'. A convergence or intersection between the surfaces 152, 156 may be an upper edge 153 of the third sloping surface 152 that may extend circumferentially and perpendicular to the axis A. An apex or intersection of the upper edge 131' and the circumferential edge 158 may be level with the undersurface of the first element cam portion 80 or may be spaced axially further away from the axial sealing surface than that undersurface. The surface 156 also may extend between the stop portion 114' and the outer surface 56. The shape of the surface 156 may be at least partially defined by the ramp portion 130' and, in at least one embodiment, the upper edge 131' may not entirely extend to the bead 66. The ramp portion 130' may extend at an angle with respect to the axis A that is different than that of the other ramp portions 90, 130, for example, at a greater angle. Whereas the other ramp portions 90, 130 may extend at about a 45 degree angle with respect to the axis A, the ramp portion 130' may extend at an angle of about 60 degrees with respect to the axis A. Accordingly, the ramp portion 130' may extend at a shallower angle that provides a more gradual lifting off of a corresponding lug of a closure. The third transition feature 150 may not be present on the second element 30b.

The circumferential elements 30a, 30b, 30c and their respective locations with respect to the first and second parting lines 60a, 60b may encourage proper threading (or unthreading) of the closure 12 to the neck finish 20 of the container 14. For example, the likelihood of cross-threading may be minimized by locating the second parting line 60b between the downturned end 122 of the second element 30b and the ramp portion 130' of the third element 30c and within ten degrees of the ramp portion 130'. Also, the shape of the ramp portion 130' may help minimize cross-threading. During removal of a closure from prior art neck finishes, the closure may cross thread or jump the typical blunt circumferential shoulder of the truncated ramp portion of the third element, particularly if a downward force is being applied to the closure during removal thereof. With the presently disclosed neck finish, however, a lug on the closure will tend to engage the ramp portion 130' and ride thereon, even if a downward force is being applied to the closure during removal thereof. It is believed that the improved performance is due to the proximity of the ramp portion 130' to the parting line, and/or the unique geometry of the ramp portion 130'.

The container 14 may be produced by plastic injection and blow molding techniques, metal stamping and drawing processes, and/or glass manufacturing techniques. For example, in production, and generally speaking, typical glass container manufacturing includes a "hot end" and a "cold end." The hot end may include one or more glass melting furnaces to produce a glass melt, one or more forming machines to form the glass melt into glass containers 14, and one or more applicators to apply a hot-end coating to the glass containers 14. The "hot end" also may include an annealing lehr, or at least a beginning portion of the annealing lehr, for annealing the glass containers 14 therein. Through the lehr, the temperature may be brought down gradually to a downstream portion, cool end, or exit of the lehr. The "cold end" may include an end portion of the annealing lehr, applicators to apply one or more cold-end coatings to the glass containers 14 downstream of the annealing lehr, inspection equipment to inspect the containers 14, and packaging machines to package the containers 14. Thus, a hot end coating is a coating applied at the hot end of the glass container manufacturing process, and a cold end coating is a coating applied at the cold end of the glass container manufacturing process.

In conjunction with the above description, the container 14 may be produced by the following glass container manufacturing process, which may or may not include all of the disclosed steps or be sequentially processed or processed in the particular sequence discussed, and the presently disclosed manufacturing process and marking methods encompass any sequencing, overlap, or parallel processing of such steps.

First, batch of glass-forming materials may be melted. For example, a melting furnace may include a tank with melters to melt soda-lime-silica to produce molten glass. Thereafter, the molten glass may flow from the tank, through a throat, and to a refiner at the downstream end of the furnace where the molten glass may be conditioned. From the furnace, the molten glass may be directed toward a downstream forehearth that may include a cooling zone, a conditioning zone, and a downstream end in communication with a gob feeder. The feeder may measure out gobs of glass and deliver them to a glass container forming operation.

Next, the glass gobs may be formed into containers 14, for example, by forming machines, which may include press-and-blow or blow-and-blow individual section machines, or any other suitable forming equipment. Blank molds may receive the glass gobs from the feeder and form parisons or blanks, which may be at a temperature, for example, on the order of 900-1100° C. Blow molds may receive the blanks from the blank molds and form the blanks into glass containers 14, which may be at a temperature, for example, on the order of 700-900° C. Material handling equipment may remove the glass containers 14 from the forming machines and place the containers 14 on conveyors or the like.

Also, the formed glass containers 14 may be annealed, for example, by an annealing lehr. At an entry, hot end, or upstream portion of the annealing lehr, the temperature therein may be, for instance, on the order of 500-700° C. During this period of time, one or more of the coatings may be applied to the necks 16 of the containers 14. Through the lehr, the temperature may be brought down gradually to a downstream portion, cool end, or exit of the lehr, to a temperature therein, for example, on the order of 65-130° C.

There thus has been disclosed a neck finish 20 having circumferentially arranged elements 30a, 30b, 30c for coupling a container 14 and a closure 12 to minimize cross-threading when the closure 12 is coupled to and/or removed from the container 14, that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A container neck finish that includes:
    a generally cylindrical outer surface;
    an axially facing sealing surface;
    a circumferentially continuous bead projecting radially outwardly from the outer surface and axially spaced from the sealing surface; and
    at least three circumferentially spaced retention elements projecting radially outwardly from the outer surface, being located axially between the sealing surface and the bead, and including:
    only one first retention element including:
        a first cam portion extending circumferentially, spaced axially from the sealing surface at a first level, and intersected by a first parting line,
        an upturned portion extending from a first end of the cam portion, and
        a first stop portion extending from a second end of the cam portion and including a first ramp portion extending to the bead, and
    two or more additional retention elements including a second retention element and a third retention element, each including:

a second cam portion extending circumferentially, and spaced axially from the sealing surface at the first level, another portion axially spaced from the bead at a second level different from the first level, and having a venting portion with a circumferentially extending retention portion, a downturned end at a first end of the venting portion, and a connecting portion extending between the retention portion and the cam portion, and a second stop portion extending from a second end of the second cam portion and including a ramp portion extending to the bead, wherein the ramp portion of the third retention element is spaced less than ten angular degrees from a second parting line and there is no circumferential overlap of the retention elements.

2. The container neck finish set forth in claim 1, wherein the ramp portion of the third retention element includes a third transition portion converging toward the neck finish outer surface as the ramp portion extends circumferentially towards the second parting line.

3. The container neck finish set forth in claim 1, wherein the upturned portion of the first retention element includes a first transition portion extending toward the axially facing sealing surface and converging radially inwardly to the outer surface.

4. The container neck finish set forth in claim 1, wherein the downturned end of the second retention element includes a second transition portion extending toward the axially facing surface and converging radially inwardly to the outer surface.

5. The container neck finish set forth in claim 1 wherein the ramp portion of the third retention element includes a circumferential edge spaced between two and five angular degrees from the second parting line.

6. The container neck finish set forth in claim 1 wherein the ramp portion of the third retention element includes a sloping surface facing circumferentially and radially outwardly and adjoining an outer surface of the third retention element and the neck finish outer surface.

7. The container neck finish set forth in claim 6 wherein the ramp portion of the third retention element includes another sloping surface facing axially and at least partially radially outwardly and adjoining at least part of the sloping surface and the neck finish outer surface, wherein an intersection between the other sloping surface and the neck finish outer surface is an upper edge of the ramp portion, and wherein an intersection between the sloping surfaces is an upper edge of the sloping surface that may extend circumferentially and perpendicular to an axis of the neck finish.

8. The container neck finish set forth in claim 7, wherein an intersection of the upper edge of the sloping surface and the circumferential edge of the ramp portion is level with an undersurface of the first cam portion or spaced axially further away from the axial sealing surface than said undersurface.

9. The container neck finish set forth in claim 1 wherein the ramp portion extends at an angle with respect to the neck finish axis that is different than that of the ramp portions of the first and second retention elements.

10. The container neck finish set forth in claim 9 wherein the ramp portion of the third retention element extends at an angle with respect to the neck finish axis that is greater than that of the ramp portions of the first and second retention elements to provide a more gradual lifting off of a corresponding retention element of a closure.

11. A container including the neck finish of claim 1.

12. A package including a container of claim 11 and a closure coupled thereto.

13. The package of claim 12 wherein the retention elements are configured for venting of the package during opening thereof, and for reducing instances of cross threading of the closure with respect to the container.

14. A container neck finish that includes:
a generally cylindrical outer surface;
an axially facing sealing surface;
a bead projecting radially outwardly from the outer surface and axially spaced from the sealing surface; and
at least three circumferentially spaced retention elements projecting radially outwardly from the outer surface, being located axially between the sealing surface and the bead, and including:
a first retention element including:
a first cam portion,
a upturned portion extending from a first end of the cam portion, and
a first stop portion extending from a second end of the cam portion and including a first ramp portion extending to the bead; and
a second retention element and a third retention element, each of the second and third retention elements including:
a second cam portion axially spaced from the bead,
another portion axially spaced from the second cam portion toward the axially facing sealing surface, and
a second stop portion that includes a ramp portion extending to the bead,
wherein the ramp portion of the third retention element includes a ramp outer surface that extends from the stop portion and radially decreases and converges to the neck finish outer surface, wherein the intersection between the ramp outer surface and the neck finish outer surface is within ten angular degrees of a parting line on the neck finish.

15. The container neck finish of claim 14, wherein the first cam portion is axially spaced from the bead at a first level, and the another portion of each of the second and third retention elements includes a venting portion that is axially spaced from the bead at a second level different from the first level and has a retention portion, a downturned end at a first end of the venting portion, and a connecting portion extending between the retention portion and the cam portion, and the second stop portion extends from a second end of the second cam portion.

16. The container neck finish of claim 14, wherein the first cam portion is intersected by another parting line.

17. A package including a container including the container neck finish of claim 14 and a closure coupled thereto, wherein the retention elements are configured for venting of the package during opening thereof, and for reducing instances of cross threading of the closure with respect to the container.

18. A container neck finish that includes:
an outer surface of the neck finish having a parting line;
an axially facing sealing surface;
a bead projecting radially outwardly from the outer surface and axially spaced from the sealing surface; and
a plurality of circumferentially spaced retention elements projecting radially outwardly from the outer surface, and being located axially between the sealing surface and the bead, wherein at least one of the retention elements includes:

a stop portion including a ramp portion that extends circumferentially toward the parting line and radially inwardly toward the neck finish outer surface and converges therewith at a location within ten angular degrees of the parting line.

19. The container neck finish set forth in claim 18 wherein the ramp portion includes a circumferential edge spaced between two and five degrees from the parting line.

20. A package including a container having the neck finish of claim 18 and a closure coupled thereto, wherein the retention elements are configured for venting of the package during opening thereof, and for reducing instances of cross threading of the closure with respect to the container.

21. A method of manufacturing a container, including the steps of:
   forming a container; and
   forming the neck finish of claim 1 on the container.

22. A method of manufacturing a container, including the steps of:
   forming a container; and
   forming the neck finish of claim 15 on the container.

\* \* \* \* \*